Sept. 9, 1924.
W. A. SCHMIDT ET AL
1,507,858
PROCESS FOR RECOVERING METALLIC VALUES FROM ORES
Filed Feb. 20, 1922   2 Sheets-Sheet 1
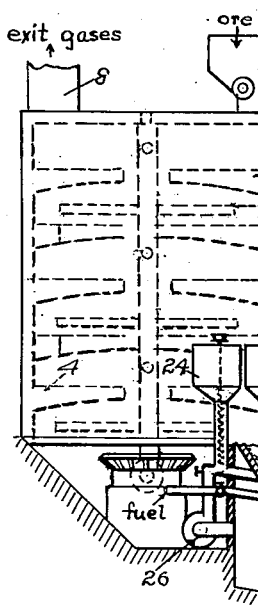
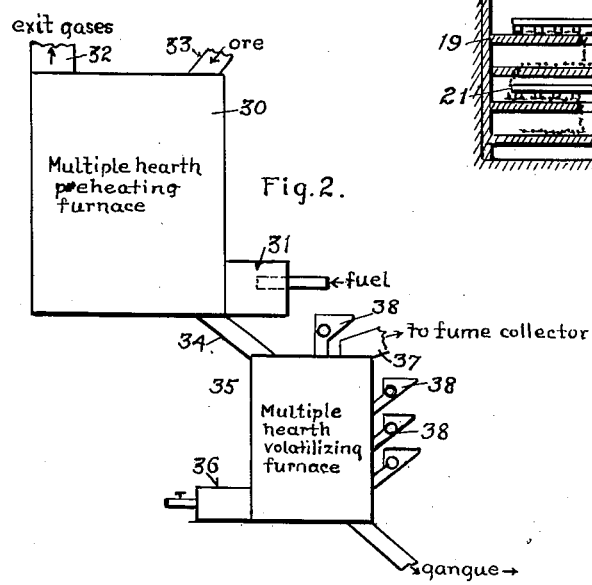
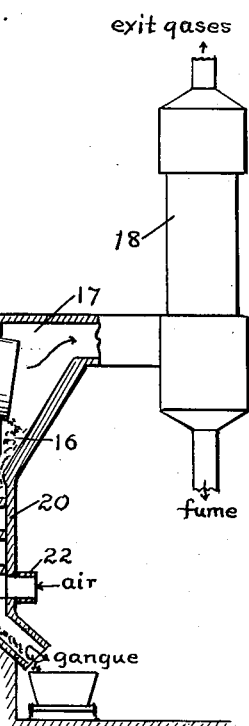
INVENTORS:
Walter A. Schmidt +
George M. Colvocoresses
by Arthur P. Knight
ATTORNEY.

INVENTORS:
Walter A. Schmidt
George M. Colvocoresses,
by Arthur P. Knight
ATTORNEY.

Patented Sept. 9, 1924.

1,507,858

UNITED STATES PATENT OFFICE.

WALTER A. SCHMIDT, OF LOS ANGELES, CALIFORNIA, AND GEORGE M. COLVOCORESSES, OF HUMBOLDT, ARIZONA, ASSIGNORS TO WESTERN METALLURGICAL COMPANY, OF HUMBOLDT, ARIZONA, A CORPORATION OF DELAWARE.

PROCESS FOR RECOVERING METALLIC VALUES FROM ORES.

Application filed February 20, 1922. Serial No. 537,689.

*To all whom it may concern:*

Be it known that we, WALTER A. SCHMIDT and GEORGE M. COLVOCORESSES, citizens of the United States, residing respectively at Los Angeles, in the county of Los Angeles and State of California, and Humboldt, in the county of Yavapai, and State of Arizona, have invented a new and useful Process for Recovering Metallic Values from Ores, of which the following is a specification.

This invention relates to the recovery of metallic values from ores by the volatilization process, in which the ore is subjected to heat in the presence of a volatilizing agent such as salt, in order to cause chlorides of the desired metals to be driven off in the form of fumes, such fumes being collected in any suitable manner. In the operation of such process serious difficulties are encountered, due mainly to the tendency of the ore to become more or less fused or sintered during the heating operation so as to interfere with the operation of the furnace, and to the tendency of an excessive amount of dust to pass off with the metallic fumes and to become collected with the fumes, giving a product which is difficult and expensive to treat for the recovery of metal therefrom. Another serious objection to the volatilization operation as heretofore carried out, is that combustion of the fuel required for heating the ore to the temperature required for volatilization, produces an excessive gas volume and when such gases are passed over the ore in volatilizing metallic values therefrom, the resulting metal-bearing fume is carried by a large volume of gases, requiring the installation of large and costly precipitators or collecting apparatus for recovering the fume. The process as heretofore carried out also requires the consumption of a large amount of fuel.

The main objects of the present invention are: to eliminate most of the dust or insoluble material from the fume carrying metallic values; to greatly reduce the volume of gases from which the fume is collected; to carry out the heating operation in such manner as to reduce the tendency of the heated ore to fuse and sinter in the furnace and thereby obviate the necessity of barring or similar operations to remove adhering deposits or "balled" material from the furnaces, and also enable more effective volatilization by reducing the superficial fusion of the ore particles which tends to check the escape of the metallic vapors; and to provide for greater fuel economy in the operation of the process.

The accompanying drawing illustrates, more or less diagrammatically, apparatus suitable for carrying out our invention, and referring thereto:

Fig. 1 is a side elevation of one form of such apparatus with parts shown in section.

Fig. 2 is a diagrammatic representation of a modified form of apparatus.

Figure 3:
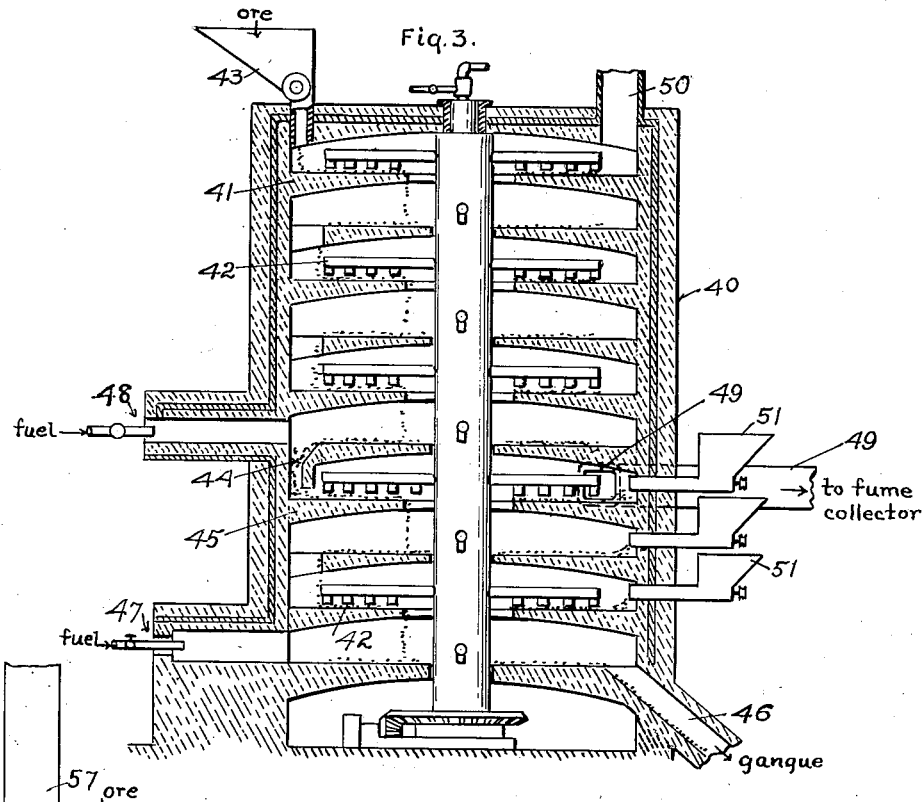
Fig. 3 is a vertical section of another form of apparatus.

Referring to the drawing, 1 indicates a preheating furnace, preferably a multiple hearth furnace of the type of the McDougal, Herreschoff or Wedge furnace, said furnace being provided with means 2 for feeding ore thereinto, such ore being supplied in a suitably crushed or divided condition and being passed continuously through the furnace by the operation of usual rabbling devices indicated in dotted lines at 3, so as to pass successively to the several hearths, indicated at 4, in the furnace and to be eventually discharged at an outlet 5. Suitable means are provided for heating the ore in passing through the furnace; for example, a combustion chamber 6 may be provided, having burner means 7 for producing hot combustion gases which pass through the furnace and upwardly between the hearths of the furnace, being eventually discharged at a stack 8.

The ore preheated in the furnace 1 is discharged through the outlet 5 directly into a furnace or kiln 10; for example, a rotary kiln which is somewhat inclined and is adapted to receive the preheated ore at its upper end and to discharge the gangue at its lower end; said kiln being mounted to rotate on suitable means 11, and being driven in the usual manner by means 12, so as to produce gradual rotation of the kiln and thereby cause the ore to be turned over and over in the kiln and to gradually pass to the lower end of the kiln. The kiln 10 is preferably provided with suitable refractory lining and if desired may be insulated to more effectively retain the heat therein. Burner means 14 are provided for injecting a flame, or jet of hot combustion gases, into the kiln 10 so as to heat the ore therein. We prefer to arrange the heating burner at the feed end of the kiln so that the heating medium passes in the same direction as the ore, the object of this being to minimize the fusing or sintering together of the ore particles. The residual gangue is delivered from the lower end of the rotary kiln to a discharge chute 16 and the fumes and gases pass from the lower end of the kiln through a suitable conduit 17 to a fume collector 18 which may be an electrical precipitator or other suitable fume arresting means. For the sake of economy in fuel, we prefer to utilize the heat from the residual gangue in preheating the air passing to the burner means 14 and to the kiln 10 for supporting combustion of fuel at such burner means. For this purpose, means such as, for example, a multiple hearth device indicated at 20, may be provided in position to receive the residual gangue from the chute 16 and to move such gangue in countercurrent with fresh air admitted into said device 20 through an inlet 22, the air being thereby heated and being conducted by a conduit 23 to the upper inlet end of the kiln 10. The heat interchanging device 20 may comprise a plurality of hearths 19, and rabbling means 21 for advancing the gangue over the hearths and from hearth to hearth, in the usual manner of multiple hearth furnace. Any other suitable heat interchanging means may, however, be used, for utilizing the heat of the gangue to preheat the air passing to the volatilizing furnace. Chute 16 is formed so as to provide a gas separating means consisting of a mass of clinker or residue separating the gases passing to stack through fume collector 18 from the air entering through the heat interchanger.

Means are provided for supplying a volatilizing agent, such as salt, to the ore after it has left the preheating furnace 1, and before or during its passage into and through the volatilizing furnace 10. For this purpose such volatilizing agent, for example, sodium chloride, may be supplied by a suitable feed means 24 to an injector pipe 25, whereby it is blown or injected into the rotary kiln or furnace 10. The injector medium used for this purpose may be heated air drawn from the conduit 23 by a pump or blower 26 and forced by said pump or blower into the injector pipe 25. Means, indicated at 13 may be provided for dropping or throwing salt into the upper end of the rotary kiln.

Our process may be carried out in the above described apparatus in the following manner: The ore to be treated which may consist of ores of copper, silver, lead and other metals in the form of oxides, carbonates, sulfides or mixtures thereof, is brought to a suitable state of division by crushing, grinding or otherwise and is fed through means 2 into the upper part of the multiple hearth furnace 1. By the action of the rabbling means in said furnace, the ore is caused to advance over the hearths and to fall from hearth to hearth until it is discharged at the outlet 5, and in thus passing through the multiple hearth furnace is subjected to the heating action of the hot gaseous products of combustion passing from 6 upwardly through the furnace. As the hot gases pass in countercurrent to the ore, it is possible to utilize such gases in the most economical manner and to bring the ore to the required high temperature with the minimum expenditure of fuel, the gases being discharged through the stack 8. For the purpose of this invention, it is desirable to heat the ore to a temperature above that at which the metallic values would be volatilized if a volatilizing agent such as salt were present; for example, to a temperature in the neighborhood of 1000° C., and by suitably proportioning the multiple hearth furnace and the rate of feed therethrough we are enabled to bring the ore to this temperature and at the same time to discharge the gaseous heating medium at a comparatively low temperature, say 400° C. or lower.

The ore preheated in the manner above described passes through the outlet 5 into the upper end of the rotary kiln 10 and the rotation of such kiln causes the ore to be rolled over and agitated and also to advance downwardly through the kiln by gravitative action. In thus passing through the kiln the ore is subjected to heating action by operation of the burner means 14 sufficient to insure the volatilizing operation, it being understood, however, that in this operation the ore need not be heated much if any above the temperature at which it leaves the preheating furnace, the heating operation in the rotary kiln being mainly for the purpose of maintaining the temperature during the volatilizing operation. The volatilizing agent such as salt in finely divided condition is preferably supplied to the rotary kiln in such manner that fresh portions of such agent are brought into contact with the ore at successive stages of the heating operation. This may be advantageously accomplished by blowing or injecting the salt or other agent into the rotary kiln by the injecting means 25, the operation of such means causing the salt to be distributed for a considerable distance along the interior of the kiln and to be brought into contact with the ore during all or a great part of the heating operation. Any other suitable means may, however, be used for feeding the salt into the ore in successive stages during the volatilizing operation, for example, the rotary kiln may be provided with means such as shown in the patent to Witherill and Vary No. 254,755, dated March, 1882, for feeding the salt into the kiln at a portion intermediate to its ends. In some cases it may be sufficient to deposit the salt in the upper part of the rotary kiln, by their feed means 13. The above described operation causes metallic values such as copper, silver, etc., to be volatilized from the ore forming fumes which pass off through conduits 17 to the collecting means 18 wherein they are collected. The residual gangue passes through chute 16 to the heat interchanger 20 wherein such residual material is caused to give up this heat to incoming fresh air, which is thereby preheated and is delivered through conduit 23 to the inlet end of the rotary kiln 10.

The above described method of operation has many advantages over methods heretofore proposed. In the first place the major portion of the heating; namely, that required to bring the ore to the volatilization temperature, is effected in a furnace which is separately fired from the volatilization furnace, so that the large volume of gases which is necessary for such preheating of the ore, is discharged through a separate stack and does not pass through the volatilization chamber or furnace.

By virtue of the larger portion of the fuel being, in general, used in the first furnace, the major dusting will take place in this furnace. As no chloridizing agent is present in this furnace, the volatilization of metals can be disregarded and the gases can be discharged directly into the atmosphere, or, if sufficient amount of dust escapes from the furnace to warrant its collection, this material can be collected and returned directly to the furnace.

In the second furnace the chloridizing agent is added while the material is hot, and by virtue of the incipient fusion, there is much less tendency to dust. Furthermore, the gas volume passing through this furnace is so small as to reduce the dusting to a minimum. In addition to this, the small gas volume carried out of the furnace permits installing a precipitator or other fume collecting device of exceedingly high efficiency at reasonable cost.

In addition to the above, the separation of the dust from the fume makes it possible to convert the fume into a marketable product by simple means and at minimum expense.

In this connection it may be stated that in the ordinary method of operation where all the heating medium used in the process passes eventually through the volatilization portion of the apparatus and into the fume collecting means, difficulty has arisen from the large proportion of "insolubles" present in the fume, such "insolubles" consisting of dust which has been entrained with the gas stream and which consists mainly of gangue or of unaltered ore. Such large proportion of "insolubles" so-called, is seriously detrimental to treatment of the fume for separation of the metals therefrom, either by a smelting operation or by hydrometallurgical operation. In case of smelting operations the amount of fluxing required for slagging off the insolubles causes a serious increase in expense of operation and loss in values in the slag; and in the case of hydro-metallurgical operation, the excessive amount of insolubles causes undue increase in cost of plant operation and in loss of metallic values in the liquid contained in the tailings. By reducing the insolubles in the fume to a minimum, the cost of reduction of the metal to marketable condition is correspondingly reduced.

In the volatilization of metals from ores in rotary kilns in which the ore passes in countercurrent to the heating gases, it has been found that many ores, when heated in this manner with a chloridizing agent such as salt, tend to fuse to a greater or less extent and in some cases such fusion takes place to so great an extent as to interfere with the operation of the kiln by reason of the material balling up or agglomerating into large masses or adhering to the walls of the kiln forming "rings," so that from time to time it is necessary to stop the operation of the kiln and break up and remove the sintered material by "barring" or otherwise. This fusing action is also detrimental in that the superficial fusion of the ore particles arrests or checks the escape of metallic vapors therefrom. It has been found that the objectionable effects of this tendency to incipient fusion can be largely overcome by causing the heating medium to pass in the same direction as the ore, while the latter is being subjected to the volatilization operation, and we, therefore, usually prefer to carry out the operation in this manner as above described. If desired, however, the heating medium may be passed through the volatilizing furnace in counter-current to the ore.

It will be understood that instead of a multiple hearth furnace for the primary heating or preheating and a rotary kiln for the volatilization treatment, other combinations of furnaces can be used, for example: two multiple hearth furnaces may be used in series as shown in Fig. 2.

In this case the upper preheating multiple hearth furnace 30, provided with firing means 31 and with a gas outlet on stack 32, receives the ore from a feed means 33 and discharges the heated ore through a chute 34 to a lower volatilizing multiple hearth furnace 35, provided with firing means 36 and with a gas outlet 37 connected by a fume collector. Means indicated at 38 may be provided for feeding salt or other volatilizing agent to one or more of the hearths of the furnace 35, as disclosed in the patent of W. A. Schmidt No. 368,973 dated February 15, 1921. If desired, a single multiple hearth furnace may be used, the upper hearths of same being separately fired from the lower hearths, as shown in Fig. 3, in which the multiple hearth furnace 40 is shown as provided with a plurality of upper hearths 41 and with rabbling means 42 for advancing the ore from the feed means 43 to an outlet 44, which conducts the ore to the lower hearths 45, which are also provided with rabbling means 42 for advancing the ore to an outlet 46 for the residual gangue. The outlet 44 is so constructed as to seal the lower hearth chambers of the furnace from the upper portion of the furnace and the lower part of the furnace is provided with burner or heat supplying means 47 separate from the burner or heat supplying means 48 for the upper part and with gas outlet means 40 separate from the gas outlet or stack 50 for the upper part of the furnace. In the operation of the process as carried out in this form of apparatus, the hot gases of combustion from the burner means 47 pass through the lower part of the furnace and between the hearths thereof and out at the outlet 49 from which they are conducted to suitable fume collecting means, and the products of combustion from the burner means 48 pass through the upper part of the furnace and between the hearths thereof to the outlet 50 through which they are discharged independently and separately from the fume-carrying gases, passing out at the outlet 49. Suitable means, such as feeding devices 51 are provided for feeding chloridizing or volatilizing agents to one or more of the hearths 45 in the lower part of the furnace. The ore which is preheated in the upper part of the furnace, in passing over the hearths 41 by the action of the hot gases passing from burner 48 over said hearths, is discharged through the outlet 38 to the lower hearths wherein it is mixed with or brought into the presence of the chloridizing agent and is further heated or maintained at high temperature by the action of the heat from the gases passing from the burner means 47; the current of hot gases supplied from said burner means causing the metallic chloride vapors produced by the action of heat and chloridizing agent on the ore, to be carried out and discharged through the outlet 49 and the metallic vapors being condensed and caught as fume in suitable collecting means. The seal between the upper and lower parts of the furnace may be constructed as an outlet chute 44 extending down into the body of ore on the hearth immediately below the same so that the ore itself forms a seal preventing the passage of gas from the lower to the upper hearth chambers. The form of furnace shown in Fig. 3 required the lower part of the furnace to be formed of material which will be resistant not only to heat, but to the action of the chloridizing or chlorine-containing vapors produced in this part of the furnace by reason of the presence of the chloridizing agent therein. For this purpose suitable material such as refractory alloys may be used for the rabbling means in such lower part of the furnace or the rabbling arms and other parts of the rabbling devices may be coated or covered with material such as graphite, silica brick, etc., or other material capable of withstanding the effect of the heat and of the chloridizing agent. In cases where such refractory materials are not available, the preheating and volatilizing furnace operation are preferably carried on in separate apparatus as shown, for example, in Fig. 1.

Figure 4:
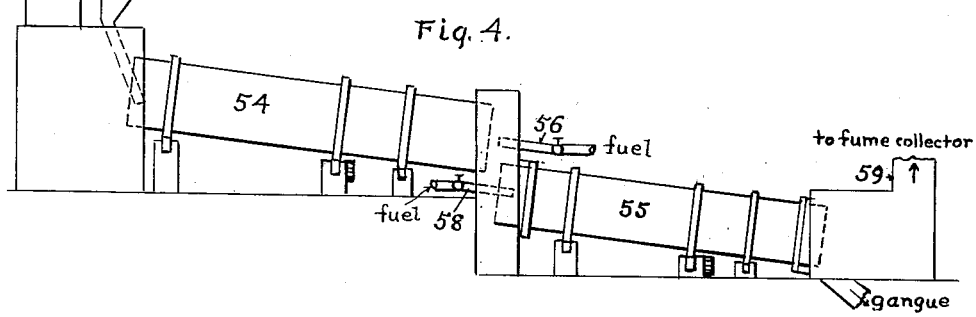
Fig. 4 is a side elevation of another type of apparatus suitable for carrying out the invention.

If desired, two rotary kilns may be used in series, for the preheating and volatilizing stages of the operation, as shown in Fig. 4; the preheating kiln 54 being heated by burner means 56 and discharging the waste gases through stack 57, and the volatilizing kiln 55 being heated by burner means 58 and discharging the fume-carrying gases through flue 59 to suitable fume collecting means. The ore is supplied by feed means 60 to the upper end of kiln 54 and is discharged in preheated condition from kiln 54 into kiln 55 and the residual gangue is discharged from the lower end of kiln 55 to any suitable means for disposing thereof. In this apparatus, as well as in the form shown in Fig. 1, the gases pass in countercurrent to the ore in the preheating stage and parallel to the ore in the volatilizing stage.

The clinker or residue from any one of the volatilizing furnaces shown may be passed through heat interchanging means in the same manner as shown in Fig. 1, or in any other suitable manner so as to utilize the heat of such clinker or residue in preheating air which is used in the combustion of fuel for supplying heat to the volatilizing stage of the process. An important advantage of the above described method of operation is that the preheating stage of operation may also be used for the purpose of roasting the ore in cases where the amount of sulphur present in the ore is in excess of that desirable for the operation. In such cases, the ore, for example, sulphide ore, can be fed to the upper hearths of the preheating furnaces and in passing through said furnace the ore is both roasted and preheated and by properly adjusting the amount of air and heat supply to the preheating furnace, any desired degree of roasting can be effected according to the requirements of the particular case so as to deliver the ore to the volatilization stage in properly roasted condition as well as at the required high temperature.

Where the operation is carried out in this manner on ore containing a large amount of sulphur, the additional advantage is secured of utilizing the heat produced in roasting of the sulphide ore in maintaining the operation and in preheating the ore for delivery to the volatilization stage of the operation.

For the purpose of effecting chloridizing volatilization it is to be understood that any desired volatilizing agent can be used; for example, any of the halogens or halogen compounds, and where salt is referred to as a chloridizing or volatilizing agent, it will be understood that this can be either sodium chloride, calcium chloride or other volatilizing agent. Furthermore, the volatilizing agent such as sodium chloride may be introduced into the kiln by converting it into the form of vapor by means of heat in a separate furnace and introducing such a vapor into the rotary kiln or other furnace used in the volatilizing stage of the operation.

The combustion gases supplied to the volatilizing furnace serve not only to maintain the temperature of the ore sufficiently high to effect volatilization, but also serve to carry off the volatilized product thereby increasing the rate of volatilization. The described method of operation with separate firing for the preheating and volatilizing operations, enables control of the amount of hot gases supplied to the volatilizing furnace so as to effect sufficient volatilization without increasing the gas volume unduly by inclusion therewith of the hot gases required for the preheating. The necessary control of the amount of gases supplied may be effected by well known means, such as dampers for reducing the flow, or fans for increasing it.

What we claim is:

1. The process which consists in preheating ore by contact with hot gases, to a temperature of about 800° C. and then adding salt to the ore and further subjecting the ore to heat to volatilize metallic constituents therefrom, and subjecting the gases bearing such metallic constituents to fume collecting operation separate from the gases in the preheating operation.

2. A process as set forth in claim 1 in which the heating of the ore in the volatilizing operation is effected by direct contact of hot combustion gases with the ore, such gases serving to carry off the fume and being subjected to collecting operation for receiving the fume.

3. The process which consists in preheating ore by contact of hot combustion gases therewith, adding volatilizing agent, salt, to the preheated ore, while it is still hot, subjecting the ore in the presence of such volatilizing agent to further heating action by means of hot gases other than those used in the preheating operation, so as to volatilize and drive off metallic values from the other, and collecting fume-bearing metallic constituents from the gases passing from the volatilizing operation separately from the gases passing from the heating operation.

4. The process of treating ores for recovering metallic values therefrom in the form of fume, which consists in first passing the ore through a preheating furnace, heating such ore while passing through said furnace by contact therewith of hot products of combustion, then introducing the preheated ore into a volatilizing furnace and subjecting the ore while in such volatilizing furnace and in the presence of a volatilizing agent to contact with hot products of combustion subjecting such products of combustion with the metallic vapors and fume contained therein to collecting operation to separate metal bearing fume, the hot gases used in preheating the ore being discharged independently and separately from the hot gases containing the metal-bearing fume.

5. The process of recovering metals from their ores by volatilizing operation which consists in subjecting the ore successively to a preheating and a volatilizing operation in separate furnaces, such furnaces being separately fired and the heating medium used in preheating the ore being discharged separately and independently of the heating medium passing through the volatilizing furnace and the gases and fumes passing from the volatilizing furnace being subjected to collecting operation to remove metal bearing constituents therefrom.

6. The process of treating sulphur-bearing ores which consists in subjecting such ores to roasting and preheating operation and bringing such ores while still hot into contact with a chloridizing agent passing hot gases over the prehated ore in presence of the volatilizing agent to carry off the volatilized material containing metallic constituents, the gases passing from such volatilizing operation being conducted away independently and separately from the gases passing from the roasting and preheating stage of the operation and being subjected to collecting operation to remove and collect therefrom fume containing metallic constituents.

7. The process which consists in subjecting sulphur bearing ore to the action of hot gases in suitable furnace means, in such manner as to roast and preheat the ore delivering such roasted and preheated ore while still hot to other furnace means, supplying volatilizing agent to the roasted and preheated ore and passing hot gases in contact with the roasted and preheated ore and the volatilizing agent to drive off metallic constituents to the ore in the form of vapor, subjecting said gases and vapors independently and separately from the gases passing in said first named furnace means and to fume collecting operation to remove and collect therefrom fume-containing metallic constituents.

In testimony whereof we have hereunto subscribed our names this 8th day of February 1922.

WALTER A. SCHMIDT.
GEORGE M. COLVOCORESSES.